United States Patent
Steger, Jr. et al.

(10) Patent No.: US 6,840,386 B2
(45) Date of Patent: Jan. 11, 2005

(54) UNITARY CENTERTUBE FOR A FLUID FILTER

(75) Inventors: Thomas H. Steger, Jr., Cookeville, TN (US); Jeffrey B. Sharp, Cookeville, TN (US); Paul D. Miller, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 60 days.

(21) Appl. No.: 10/095,278

(22) Filed: Mar. 11, 2002

(65) Prior Publication Data

US 2003/0168398 A1 Sep. 11, 2003

(51) Int. Cl.[7] ............................................. B01D 29/19
(52) U.S. Cl. ................... 210/457; 210/497.01
(58) Field of Search ....................... 210/437, 457, 210/497.01, 483

(56) References Cited

U.S. PATENT DOCUMENTS

| | | | | |
|---|---|---|---|---|
| 1,202,515 A | * | 10/1916 | Hardin et al. ............... | 166/233 |
| 2,684,764 A | * | 7/1954 | Gerwig et al. .............. | 210/457 |
| 2,770,426 A | * | 11/1956 | Sievers ..................... | 242/118.8 |
| 2,905,326 A | * | 9/1959 | Judson et al. ............... | 210/457 |
| 4,333,893 A | * | 6/1982 | Clyde .......................... | 261/94 |
| 4,526,688 A | * | 7/1985 | Schmidt et al. .......... | 210/323.2 |
| 5,190,161 A | * | 3/1993 | Arai ............................ | 209/400 |
| 5,423,984 A | * | 6/1995 | Belden ....................... | 210/232 |
| 5,587,071 A | * | 12/1996 | Belden ....................... | 210/232 |
| 5,736,045 A | * | 4/1998 | Bies et al. ............. | 210/497.01 |
| 5,783,067 A | * | 7/1998 | Belden ....................... | 210/232 |
| 5,982,142 A | * | 11/1999 | Sullivan et al. ............. | 320/118 |
| 5,996,810 A | | 12/1999 | Bounnakhom et al. ..... | 210/443 |
| 6,045,693 A | | 4/2000 | Miller et al. ................ | 210/248 |
| 6,401,938 B1 | * | 6/2002 | Schewitz .................... | 210/457 |

FOREIGN PATENT DOCUMENTS

| | | | | |
|---|---|---|---|---|
| EP | 0 769 317 | 4/1997 | .......... | B01D/29/21 |
| EP | 0 751 813 | 1/1998 | .......... | B01D/29/15 |
| GB | 1 539 505 | 1/1979 | .......... | B01D/29/06 |
| WO | WO 02 16004 A | 2/2002 | .......... | B01D/29/15 |

* cited by examiner

Primary Examiner—Terry K. Cecil
(74) Attorney, Agent, or Firm—Woodard, Emhardt, Moriarty, McNett & Henry LLP (57) ABSTRACT

A unitary centertube, molded out of a synthetic material and designed for use as part of a fluid filter, includes a tubular body portion arranged with a plurality of annular ribs in alternating sequence with a plurality of annular recessed sections, the tubular body portion defining a plurality of fluid flow apertures and an interior opening. The plurality of fluid flow apertures are arranged in two styles to facilitate the mold design. Included as part of the unitary centertube is a cross-beam section positioned in the interior opening for providing reinforcement to a corresponding filtering element when subjected to a differential pressure.

8 Claims, 7 Drawing Sheets

UNITARY CENTERTUBE FOR A FLUID FILTER

BACKGROUND OF THE INVENTION

The present invention relates in general to fluid filters, preferably disposable fluid filters which include a filter cartridge. More specifically the present invention relates to the design and construction of the filter cartridge used in a disposable fluid filter, and focuses on the design of the centertube which is an important component of the fluid filter cartridge. The type of disposable fluid filters discussed herein, in the context of the present invention which incorporate a centertube, are typically used or are associated with diesel engine technology. While the present invention centertube may be used with replaceable filter cartridges, the present invention centertube will be described in the context of a disposable fluid filter.

A review of earlier fluid filter technology reveals that the use of a centertube is quite common, either as a component part of a replaceable filter cartridge or as a component part of a disposable fluid filter. In either arrangement, the centertube is intended to provide support for the filtering element. Fluid filters of the type described herein typically experience a significant differential pressure across the filtering element. This differential pressure in turn provides the possibility of the filter element collapsing into its hollow interior due to this differential pressure. This particular issue has to be addressed in the design of fluid filters, fluid filter cartridges, and centertubes. The preferred design solution is to use the centertube as a support member in order to provide the requisite structural strength to the filter cartridge. Regardless of whether the fluid filter is designed as a disposable unit or configured with a replaceable filter cartridge, there is value in having a properly designed and integrated centertube to provide the needed support to the interior of the filtering element.

Obviously the magnitude of the differential pressure which is seen by the filtering element will have some bearing on the degree of strength and rigidity required of the centertube. If the (fluid) filtering element sees a differential pressure of between 150 psi and 200 psi, conventional centertube designs might still be acceptable. However, higher differential pressures in the 350 psi to 400 psi range require current centertube designs to be reinforced and/or increased in wall thickness or changed as to the materials which are used in order to generate added strength and rigidity. These design changes will cause an increase in the overall cost of the centertube. Accordingly, the importance of the centertube comes into greater focus when the fluid filter is expected to see a relatively high (350–400 psi) differential pressure.

Since a differential pressure in the 400 psi range is not believed to be typical, are there fluid filter design applications where such a differential pressure might be seen? In the context of the present invention, it was desired to design a suitable fluid filter for use with a new high-pressure fuel system. The specifics of the associated components for this new fuel system are influenced by the viscosity of the fuel which may be seen, particularly when cold, and the operation of a gear pump which is used for fuel delivery to the fuel filter. The system analysis which was conducted predicted a need for the filter cartridge to be able to perform with a differential pressure of 380 psi and the system specification was set at 400 psi.

When the filter cartridge needs to be capable of withstanding the pressures created by higher pressure systems, such as the referenced high-pressure fuel system, earlier centertube designs have focused on reinforcement efforts. For example, one design approach simply uses a thick-walled, welded metallic centertube. Another approach uses a somewhat standard metallic lock-seam centertube with an inserted spring support. A still further approach uses a plastic centertube with an inserted plastic post that includes various support ribs. While these early designs may be functional, they tend to be expensive due to the number of components, the material costs, and the labor associated with assembly.

As a result of the need for an improved centertube design from at least a cost perspective, without compromising performance and enabling the centertube to be suitable for the new high-pressure fuel system, the present invention was conceived and reduced to practice. The design of the present invention centertube focuses on a unitary, molded construction with a novel and unobvious cross-beam support which yields a "mold-friendly" centertube design with the requisite strength to handle high differential pressures.

SUMMARY OF THE INVENTION

A unitary centertube for use as part of a fluid filter according to one embodiment of the present invention comprises a tubular body portion defining a plurality of fluid flow apertures and an interior opening and a cross-beam section positioned in the interior opening and being designed and arranged in unitary combination with the tubular body.

One object of the present invention is to provide an improved centertube for a fluid filter.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
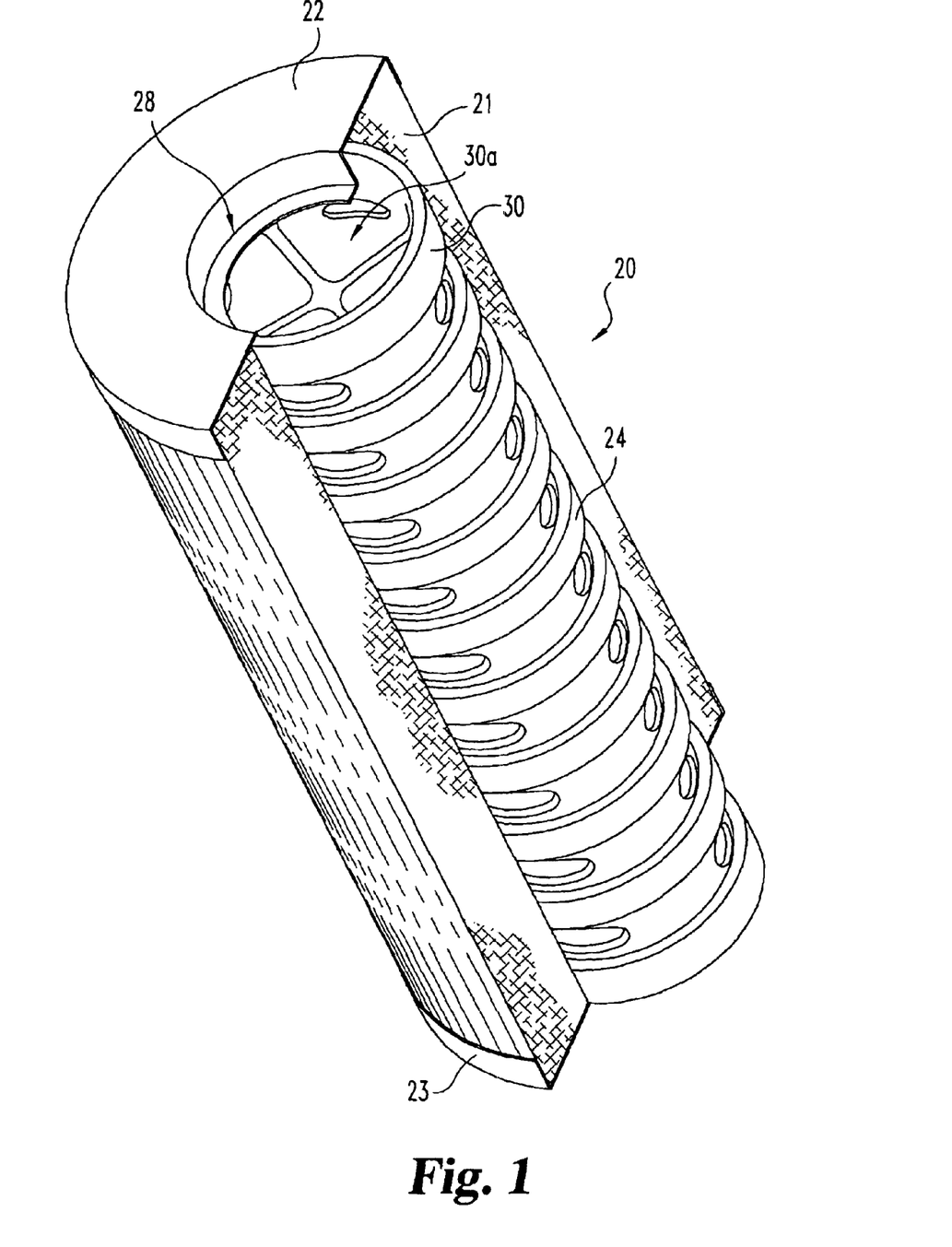
FIG. 1 is a fragmentary, perspective view of a fluid filter cartridge incorporating a unitary centertube according to a typical embodiment of the present invention.
Figure 2:
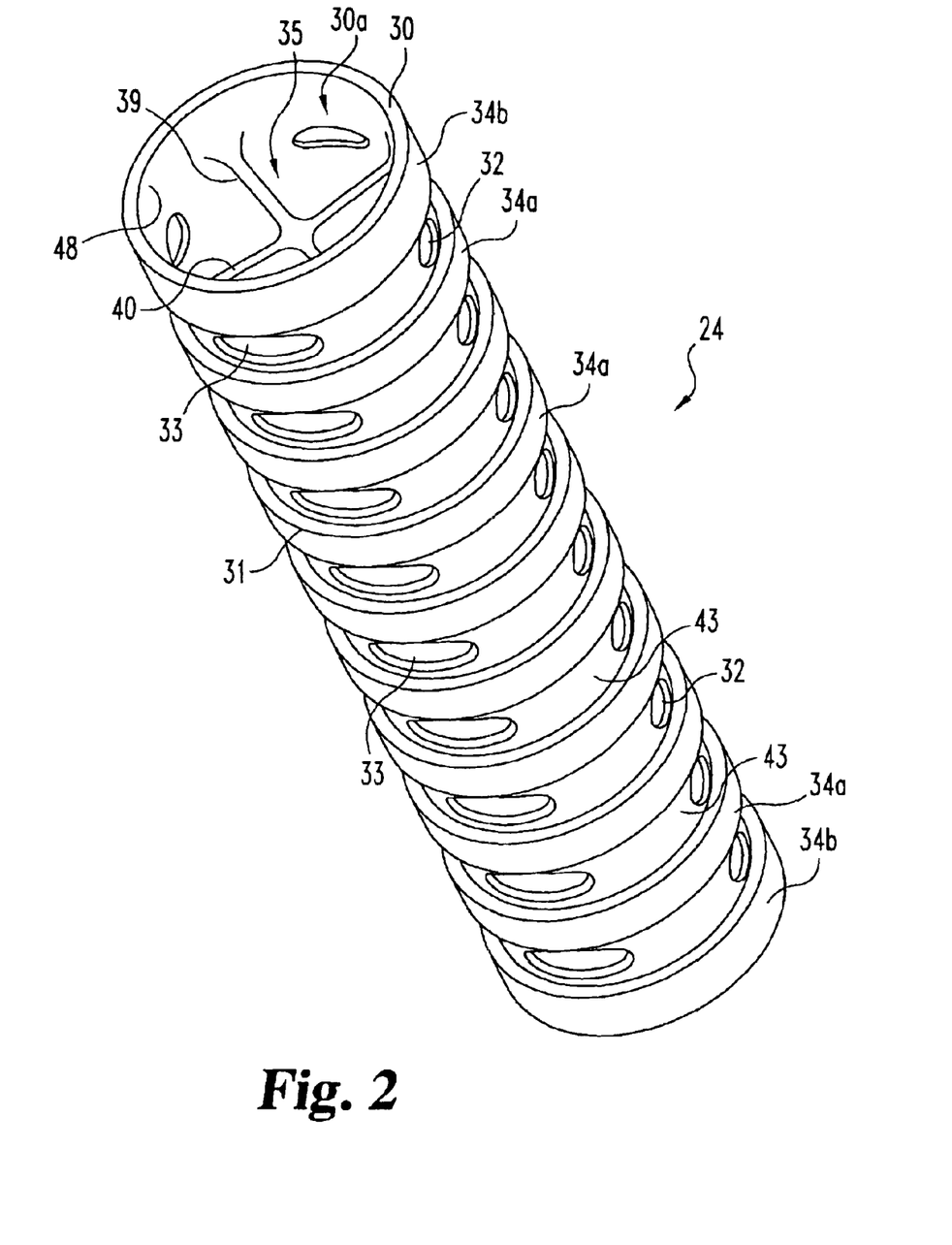
FIG. 2 is a perspective view of the FIG. 1 centertube.

Referring to FIG. 1, there is illustrated a fluid filter cartridge 20 which is designed for use as part of a disposable fluid filter (not illustrated), which is preferably associated with a diesel engine. As would be understood, filter cartridge 20 is positioned inside of a filter housing which includes the requisite fluid connections and sealed interfaces to enable the properly directed flow of fluid into and through the fluid filter where it is filtered by filtering element 21. Also included as part of filter cartridge 20 is an upper endcap 22, a lower endcap 23, and a centertube 24 which is designed and arranged according to the present invention. In the preferred embodiment of the present invention, fluid filter cartridge 20 is used with a high-pressure fuel system such that the fluid filter cartridge 20 is expected to see a differential pressure of between 350 psi and 400 psi.

The details of centertube 24 are illustrated in FIGS. 2-7. With the exception of centertube 24, the balance of the components of cartridge 20 are considered to be generally consistent with current designs for these components. While the present invention is directed to centertube 24, its design features have enabled other changes to be made to the filtering element 21, as will be described herein.

In the fabrication of cartridge 20, the generally cylindrical, tubular centertube 24 is first inserted into the hollow interior of the filtering element 21. The filtering element is substantially cylindrical with a hollow, generally cylindrical clearance space. The inside diameter size of filtering element 21 provides a close fit to the outside diameter size of centertube 24 so as to try and achieve a near line-to-line fit. In this way, any inward radial movement of the inside diameter surface of the filtering element 21, due to an experienced differential pressure, will immediately butt up against centertube 24. This will allow centertube 24 to most effectively perform its function of providing adequate structural strength and rigidity to the filtering element 21 when a high differential pressure is seen.

The next step in the fabrication of cartridge 21 is to place one of the endcaps, either upper endcap 22 or lower endcap 23, on a flat surface, on its outer face so as to expose either a circular or an annular-ring shaped trough which is designed with an outer lip to hold a measured volume of a potting compound. Once the potting compound is placed in the trough, the filtering element 21, with the installed centertube 24, is pushed into the volume of potting compound. Once the potting compound cures, this subassembly is turned, end for end, and the procedure is repeated for the other endcap.

The upper endcap 22 is a metal component in annular ring form with a centered (concentric) exit flow aperture 28. The fluid passing through the filtering element 21 enters the centertube 24 and exits from the filter cartridge 20 via aperture 28. In order to direct and route the fluid flow through filtering element 21 out through aperture 28, the lower endplate 23, also a metal component, is in the form of a solid disk and does not have any centered opening or other perforations. Otherwise, upper endcap 22 and lower endcap 23 are identical and are assembled to close off their respective filtering element ends in virtually an identical manner.

As for the filtering element 21, this may be a pleated paper design or may be fabricated from synthetic materials. Typically, a thin metal screen or mesh is used as an inner liner for the filtering element to prevent any portion of the filtering element media from extruding through the wall of the centertube. This is a potential issue with centertube designs that have larger flow apertures in their exterior wall. With such larger flow apertures, the metal screen as a liner is important. By configuring centertube 24 of the present invention with a series of smaller flow apertures 32 and 33, the filtering element media does not extrude into these centertube apertures, even when the metal screen liner is eliminated. As a result, the present invention enables the elimination of one more component part and thereby creates a simplification to the fabrication procedure for the fluid filter. The elimination of this metal screen or mesh as a filtering element liner also helps to reduce the overall cost for the filtering element. In place of using the metal mesh or screen as a liner, the present invention for centertube 24 permits the use of only a paper-backed media. As should be understood, this is a less expensive alternative to the metal screen liner and a design change which is enabled by the present invention centertube.

The fluid filter cartridge 20 illustrated in FIG. 1 is intended to be used as part of a disposable fluid filter which needs to be designed to perform satisfactorily at elevated differential pressures in the 400 psi range. In order to design a suitable centertube for such an application, the present invention was conceived and the conceived centertube is illustrated in FIGS. 2-7.

Referring to FIGS. 2-7, the details of centertube 24, according to the present invention, are illustrated. What is disclosed as centertube 24 is a generally tubular component body 30 with a circumferentially ribbed exterior 31, flow apertures 32 and 33 between adjacent annular ribs 34a and 34b, and a four-spoke or four-partition cross-beam section 35 which axially extends for a majority of the overall axial length of body 30.

Centertube 24 is an injection molded component which is preferably made out of glass-filled nylon material. Specifically, the selected material is nylon 6/6, thirty percent (30%) glass. Centertube 24 has a unitary construction and thus it is important to understand that cross-beam section 35 is molded as a unitary portion of body 30 and is not separately fabricated and inserted or otherwise assembled to the remainder of centertube 24. However, while this is the preferred embodiment and best mode of the present invention, it is anticipated that an alternative would be to include molded-in grooves or channels or a similar retention slot as part of the tubular body for the centertube and add the cross-beam section 35 as a separate slide-in component, with either a snug line-to-line fit or a snap-in receipt. It is also envisioned that the cross-beam section 35 might insert into the tubular body and be seated with a quarter turn feature. Since this alternative is not believed to represent the lowest cost nor the most efficient design, the focus of the present disclosure is on the preferred embodiment wherein centertube 24 is a unitary, molded structure.

Continuing with the description of centertube 24, the addition of the cross-beam section 35, which is arranged in unitary combination with the tubular body of centertube 24, provides a significant increase in the collapse resistance of centertube 24 and eliminates the need for additional components or a more expensive, welded, metallic composition. The two cross-beams 39 and 40 interfit with each other by means of a ninety degree crossing intersection in order to create cross-beam section 35. Further, cross-beams 39 and 40 combine with the inside surface of body 30 to divide the interior opening 30a into four uniformly configured and shaped quadrant volumes 35a, 35b, 35c, and 35d. The inner diameter surface of the centertube body 30 and cross-beams 39 and 40 are drafted from the center out in both directions along the longitudinal axis of the centertube to allow for removal of the injection mold tooling. The flow apertures 32 and 33 are oriented so that the mold pins can pull along a single axis for additional tooling simplicity. The flow apertures 32 and 33 and cross-beams 39 and 40 are oriented so as to produce even or uniform flow distribution within the centertube.

Although cross-beams 39 and 40 have been described in a manner that might be interpreted as referring to separate and distinct components, it is to be noted that these cross-beams are part of a unitary molded structure and thus it is not realistic to try and determine which portion of which beam comprises which portion of their crossing intersection. Nevertheless, it should be clear that beyond this crossing intersection, there are oppositely extending portions or spokes for cross-beam 39 and oppositely extending portions for cross-beam 40 which are each ninety degrees apart. These "spokes" partition the interior opening into the four quadrant volumes.

With continued reference to FIGS. 2-7 and the details of centertube 24, the centertube has an overall axial height of 18 cm (7.087 inches). Further, each interior annular rib 34*a*, eight total, has an axial height or thickness of 6.5 mm (0.256 inches). Each of the exterior or end annular ribs 34*b*, two total, has an axial height or thickness of 10 mm (0.394 inches). In alternating sequence with ribs 34*a* and 34*b* there are nine annular, recessed sections 43, each recessed section 43 having a top chamfer 44 and a bottom chamfer 45 (45 degree angles) as the connecting interface with the adjacent rib, either 34*a* or 34*b*, depending on the specific section 43 and its location. The axial height of each section 43 is 9 mm (0.354 inches) and the radial depth of each chamfer is 1.5 mm (0.059 inches).

While centertube 24 has been described as tubular due to its "generally" cylindrical shape and hollow interior, except for the cross-beam section, the ribbed exterior surface 31 is not a true cylinder or a straight cylinder due to the recessed areas represented by the annular recess sections 43. However, each of ribs 34*a* and 34*b* are cylindrical and have the same outside diameter.

Figure 3:
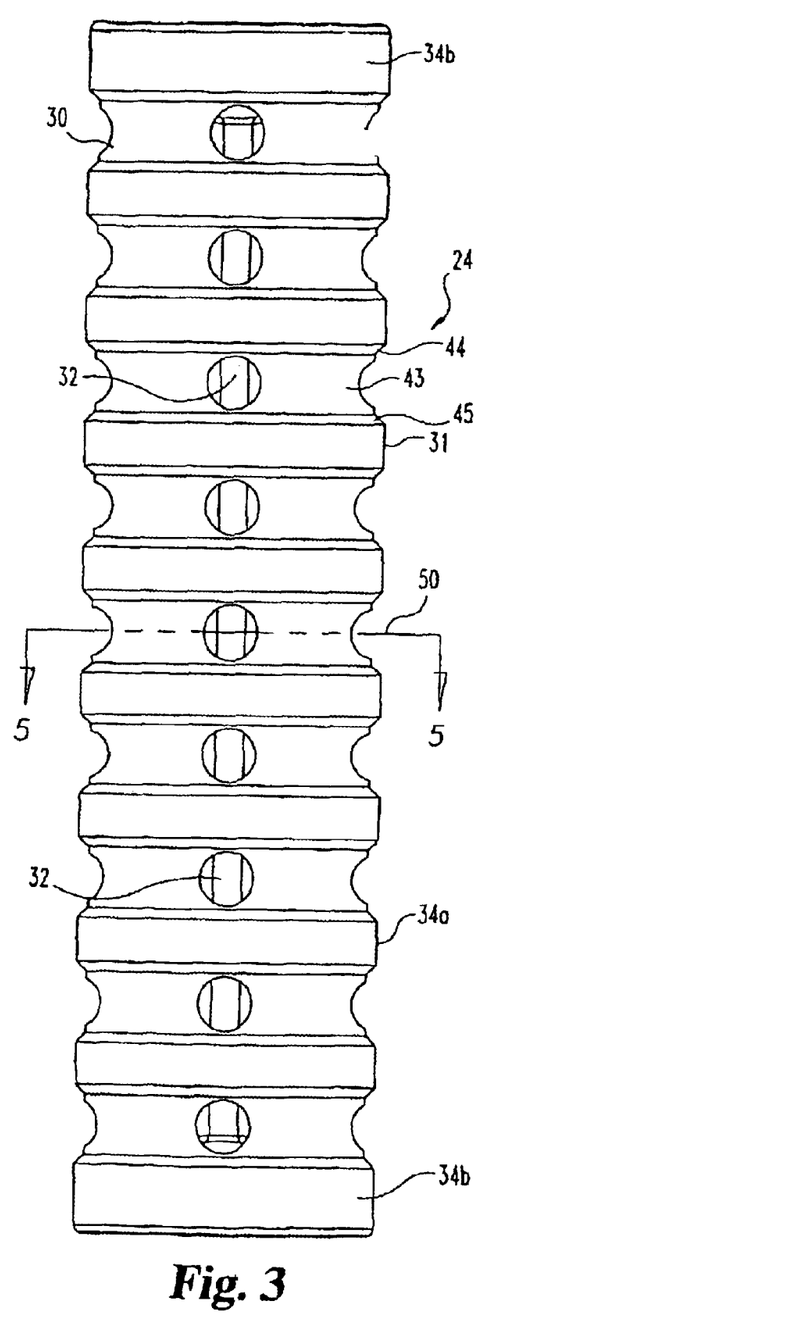
FIG. 3 is a front elevational view from one side of the FIG. 1 centertube.
Figure 4:
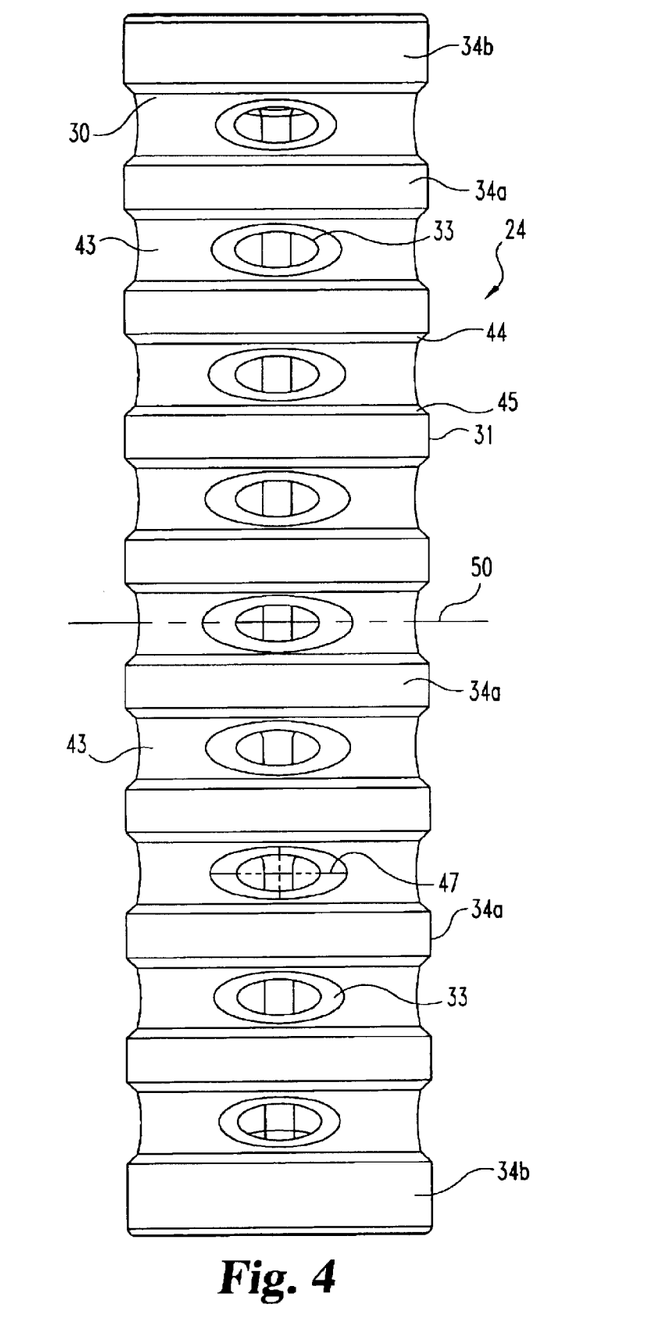
FIG. 4 is a front elevational view from another side of the FIG. 1 centertube.

With reference to FIGS. 3 and 4, it should be noted that each flow aperture 32 has a circular shape and each flow aperture 33 has an oval shape which includes a major and a minor axis (see FIG. 4). Each flow aperture 32 has a diameter of approximately 8 mm (0.315 inches) and this is also the minor axis dimension of the oval shape of flow aperture 33. If the centertube 24 is thought of as having four "sides" which are ninety degrees apart, even though centertube 24 is tubular, it is easy to understand the positioning of the eighteen flow apertures 32 and the positioning of the eighteen flow apertures (ovals) 33. Specifically, each flow aperture 32 is centered between adjacent ribs 34*a*, 34*b* which means that each such flow aperture 32 is centered in a corresponding one of the recessed sections 43. With nine recessed sections, there are nine flow apertures 32 on one "side" and nine flow apertures 32 on the 180 degree opposite "side". In a similar manner, each flow aperture (oval) 33 is centered between adjacent ribs 34*a*, 34*b* which means that each flow aperture 33 is centered in a corresponding one of the recessed sections 43. With nine recessed sections, there are nine flow apertures 33 on one "side" and nine flow apertures 33 on the 180 degree opposite "side". Each series of nine flow apertures 33 is circumferentially spaced ninety degrees apart from each series of nine flow apertures 32 and vice versa.

The size and shape of the flow apertures 32 and 33 are important for two reasons. First, these apertures need to be small enough to prevent any of the filtering media from extruding through these centertube apertures. The issue or concern of "extruding" is magnified when operating at the higher differential pressures which are at issue herein, noting that these higher differential pressures were part of the driving force behind the conception of the present invention. Second, the size, shape and location of these flow apertures 32 and 33 need to be specified so as to be compatible with the mold design and actually help to facilitate the design of the mold to keep down the mold complexity and cost.

Regarding the first reason and the corresponding objective, the 8 mm diameter dimension of flow apertures 32 and the 8 mm minor axis dimension of flow apertures 33 is considered to be small enough in order to prevent any extruding of the filtering media through these flow apertures, even at the elevated differential pressures specified for the present invention, and even with a paper-backed media.

Figure 5:
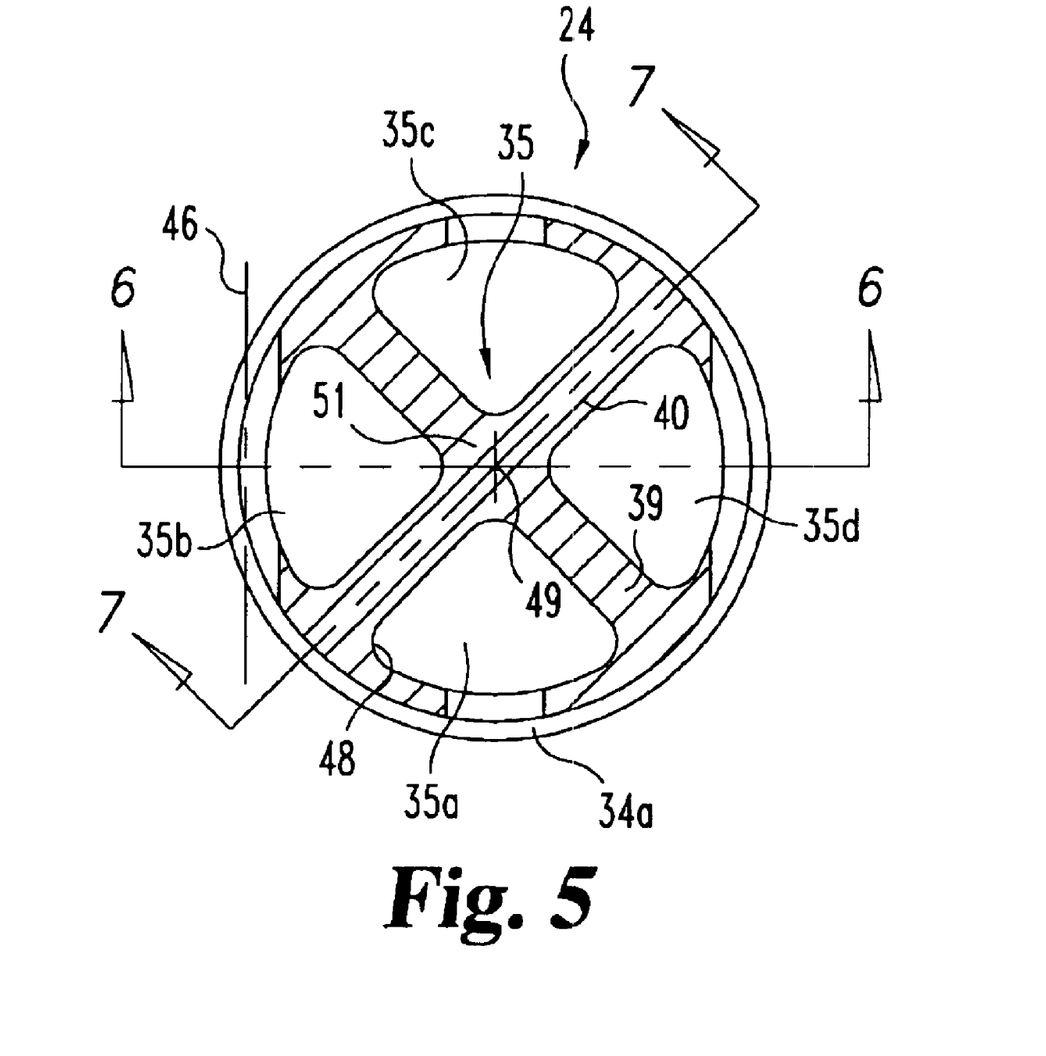
FIG. 5 is a top plan view, in full section, as viewed along line 5—5 in FIG. 3.

Regarding the second reason and the corresponding objective, it will be necessary to carefully review FIG. 5 and to visualize a cylindrical molding pin oriented with its longitudinal axis coincident with broken line 46 in FIG. 5 which is a line that is perpendicular to the longitudinal axis of centertube 24. Further, this referenced molding pin has its longitudinal axis centered along the major axis 47 of the corresponding flow aperture 33, see FIG. 4. This particular example of where and how the referenced molding pin is positioned relative to the selected flow aperture 33 is typical for every flow aperture 33 of centertube 24, requiring an equal number of molding pins. The key to this design is that a straight cylindrical pin, positioned as described and intersecting the sidewall of a tubular form, such as recess section 43, creates the outline shape and the corresponding depth of each flow aperture 33, as described and illustrated herein. This design permits all of the molding pins for flow apertures 33 to be pulled along a single direction (all parallel) which is the same direction the molding pins for flow apertures 32 will be pulled. This greatly simplifies the overall mold design and tooling. Further, by placing a flow aperture, either 32 or 33, in each quadrant volume 35*a*, 35*b*, 35*c*, and 35*d* and in each recessed section 43, the present invention provides an even and uniform flow distribution within centertube 24. The numbers and quantities also agree as should be understood. With nine recessed sections 43 and with four interior quadrants created by the partitioning of the hollow interior due to cross-beam section 35, there are actually 36 individual quadrant volumes, assigning four each to each recessed section 43. There are, correspondingly, eighteen flow apertures 32 and eighteen flow apertures 33 for a total of thirty-six, one for each individual quadrant volume.

With continued reference to FIGS. 3 and 4, and with reference to FIG. 5, the section view (geometric cutting plane 5—5) of FIG. 3 is illustrated in FIG. 5. This cutting plane passes through a recess section 43 and the adjacent (lower) rib 34*a* thus appears as an outer, annular ring (not sectioned) in FIG. 5. Also shown in FIG. 5 are two flow apertures 32 (180 degrees apart) and two flow apertures 33 (180 degrees apart). Importantly, each beam 39 and 40 and the shape of each beam is illustrated in FIG. 5. This drawing also shows how the beams 39 and 40 blend into the inner surface 48 of the body 30 of centertube 24. There is a "blend" radius, one on each side of each beam, as it joins with the inner surface 48. The radial centerline of each beam 39 and 40 is positioned 45 degrees from the radial centerline of each adjacent pair of flow apertures 32 and 33. There is a one degree draft angle on each beam 39 and 40 from the center point 49 outwardly in order to facilitate the mold design and release of the mold tooling.

In order to create a uniform flow pattern and distribution for the fluid flowing through centertube 24, it is preferable to have a flow aperture provided for each partitioned volume of the interior space of centertube 24. While logically all of the alternatives discussed above remain possibilities, the realities of the molding process in terms of the movement of the molding pins strongly suggest that the disclosed cross-beam section 35, dividing the interior into four quadrant volumes, is the preferred design.

While cross-beam section 35 is preferably of a cruciform design, as illustrated, alternatives are contemplated. Looking first at cross-beam section 35, its top plan view, in full section, can be viewed as having two intersecting partitioning panels, resulting in what appears to be four spokes in this top plan view where each of the four spokes is perpendicular to its adjacent spokes and thus evenly spaced at ninety degrees from one another. With regard to the alternatives which are contemplated, it is envisioned that other arrangements of intersecting or joined partitioning panels could be created, resulting in an evenly spaced or an unevenly spaced series of "spokes". These spokes are outwardly radiating from a center intersection or hub and the opposite end of each spoke is in unitary construction with the inside surface of the body 30 of centertube 24. For example, three evenly spaced spokes would be arranged on 120 degree spacing and would divide the interior opening 30*a* into three partitioned volumes. With the cross-beam design of section 35, the interior of body 30 is partitioned in what has been described as "quadrant" volumes, simply because there are four. However, if a different number of partitions or partitioning spokes are used to create section 35, the number of individual partitioned or segmented volumes would dictate the descriptive terminology for these volumes.

Figure 6:
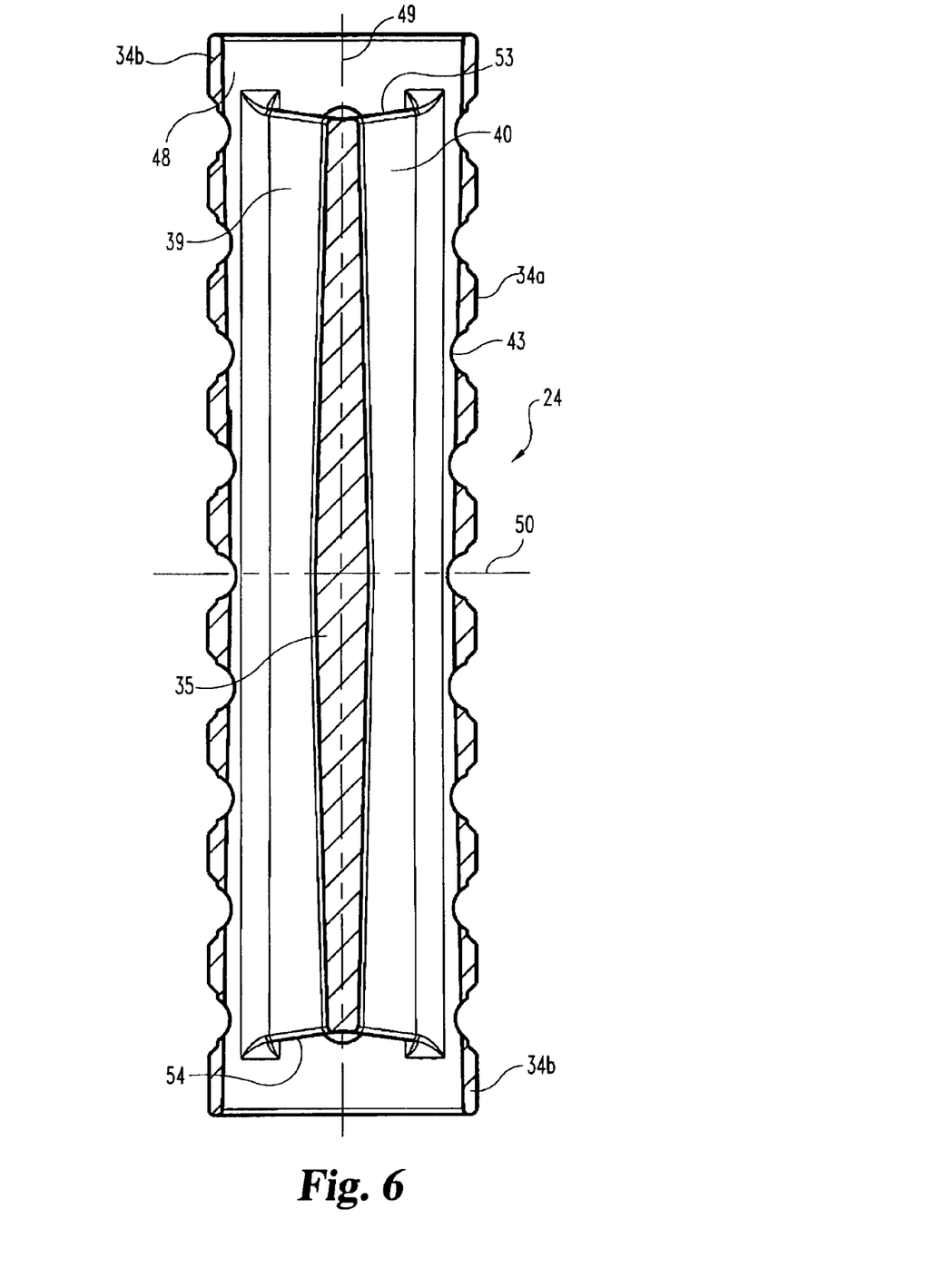
FIG. 6 is a front elevational view, in full section, as viewed along line 6—6 in FIG. 5.
Figure 7:
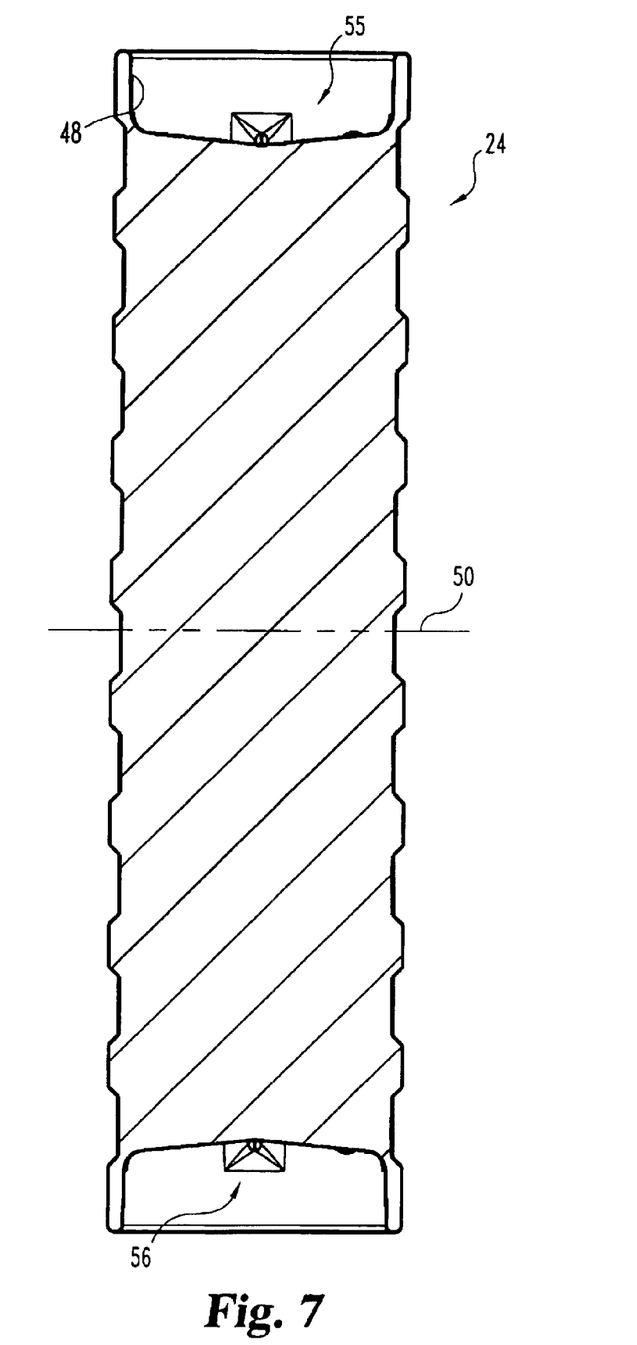
FIG. 7 is a front elevational view, in full section, as viewed along line 7—7 in FIG. 5.

With regard to the views provided by FIGS. 6 and 7, a brief explanation will be helpful. As will be understood from the FIG. 3 cutting plane 5—5, the top plan section view of FIG. 5 looks "down" at only the lower half of centertube 24. Consequently, any further sectioning views to the FIG. 5 illustration would only yield the lower half of centertube 24. However, since centertube 24 is symmetrical, top to bottom, on opposite sides of lateral centerline 50 the upper half and the lower half of centertube 24 are identical or what would be considered symmetrical about centerline 50, just as if the centertube would be "folded" top to bottom about centerline 50. Centerline 50 is coplanar with the geometric plane of cutting plane 5—5. What has been done in FIGS. 6 and 7 is to illustrated the entire centertube 24, not just the lower half which would represent a more technically precise illustration based on cutting planes 6—6 and 7—7 in FIG. 5, noting that FIG. 5 is a top plan view of the lower half of centertube 24. Once the lower half of centertube 24 is properly depicted, the upper half of centertube 24 is created in a virtually identical or symmetrical fashion by simply folding the lower half, bottom-to-top, about centerline 50 so as to create the upper half illustration. In this way, the complete centertube 24 can be illustrated in FIGS. 6 and 7.

Referring first to FIG. 6, the interior features of centertube 24 are illustrated with an emphasis on the shape and positioning of each beam 39 and 40 which are integrally joined in a ninety degree crossing pattern at their geometric centers so as to create cross-beam section 35. As illustrated, starting with lateral centerline 50, the center intersection 51 of beams 39 and 40 tapers with a one degree draft angle as the intersection 51 extends away from centerline 50 in a downward direction and, in a symmetrical fashion, as the intersection 51 extends away from centerline 50 in an upward direction. This one degree draft angle resulting in a narrowing in each direction away from lateral centerline 50 facilitates the molding of centertube 24 in that it allows the mold sections to separate more easily away from centerline 50. A careful review of FIGS. 3, 4, and 5 will confirm the shape geometries and structural relationships which are illustrated in FIGS. 6 and 7.

The inner surface 48 also has a one degree draft angle as it extends away from centerline 50 in each direction. This one degree draft angle causes a narrowing of the tubular wall for body 30 from the inside and thus a widening of the clearance as centertube 24 extends upwardly away from centerline 50 and downwardly away from centerline 50. The outer diameter of ribs 34*a* and 34*b* does not change. Again, the construction of centertube 24 is symmetrical, top to bottom, about centerline 50.

The cross-beams 39 and 40 which are integrally joined to create cross-beam section 35 blend into the inner surface 48 of centertube body 30, with an upwardly flared edge. This occurs at the axial upper end 53 of cross-beam section 35 as well as at the axial lower end 54 of cross-beam section 35. This is why small end sections are visible in FIG. 6 and in FIG. 7. In the FIG. 7 illustration, the cutting plane extends through the centerline of beam 39 and thus the entire body of what is illustrated appears as a solid section, except for the recessed areas 55 and 56 at opposite ends, due to the fact that the cross-beam section 35 does not extend the full axial length of the centertube body 30, but it does extend for more than a majority of that length. The depth of the recessed area 55 is approximately 14 mm (0.551 inches), excluding the small end sections of each beam that blend into the interior surface 48. Due to the symmetry of centertube 24 top to bottom about centerline 50, the depth of recessed areas 56 is also approximately 14 mm (0.551 inches), excluding the small end sections of each beam that blend into the interior surface 48.

Following the initial conceptual design of the present invention and early prototyping, finite element analysis was conducted to ensure that the envisioned design for centertube 24 would meet the 400 psi differential pressure requirement outlined herein. The modeling analysis provided a prediction that centertube 24 would give a collapse strength of at least 500 psi. Additionally, cost projections and quotations for centertube 24 showed a cost figure which is less than one-half the cost of an "equivalent" welded, metallic centertube. In this context, "equivalent" means equivalent as to size and strength, but obviously not equivalent as to overall cost and not equivalent as to fabrication method or design.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A unitary centertube for use as part of a fluid filter, said unitary centertube comprising;

a tubular body portion defining an interior opening and including a plurality of annular ribs and a plurality of recessed sections, each recessed section formed between respective ones of said annular ribs and axially spaced along an outer surface of said body portion;

a cross-beam section positioned in said interior opening and being constructed and arranged in unitary combination with said tubular body portion, said cross-beam section constructed and arranged for partitioning said interior opening into four quadrant volumes, said tubular body portion including a longitudinal dimension and said cross-beam section extending axially through said interior opening for a majority of said longitudinal dimension; and wherein each recessed section of said plurality of recessed sections defines at least one first fluid flow aperture having a first configuration and opening into a first one of said four quadrant volumes and at least one second fluid flow aperture having a second configuration that is different from said first configuration and opening into a second one of said four quadrant volumes.

2. The unitary centertube of claim 1 wherein there is a fluid flow aperture in flow communication with each of said four quadrant volumes.

3. The unitary centertube of claim 2 which further includes a lateral centerline, said unitary centertube having an upper half and a lower half which are designed and arranged to be symmetrical to each other about said lateral centerline.

4. The unitary centertube of claim 3 said first configuration corresponding to said first fluid flow aperture is circular in shape.

5. The unitary centertube of claim 4 wherein said second configuration corresponding to said second fluid flow aperture is oval in shape.

6. The unitary centertube of claim 1 which further includes a lateral centerline, said unitary centertube having an upper half and a lower half which are designed and arranged to be symmetrical to each other about said lateral centerline.

7. The unitary centertube of claim 1 wherein said first configuration corresponding to said first fluid flow aperture is circular in shape.

8. The unitary centertube of claim 1 wherein said second configuration corresponding to said second fluid flow aperture is oval in shape.

* * * * *